(12) United States Patent
Inoue (10) Patent No.: US 12,109,907 B2
(45) Date of Patent: Oct. 8, 2024

(54) POWER SUPPLY SYSTEM

(71) Applicant: DENSO WAVE INCORPORATED, Aichi-pref. (JP)

(72) Inventor: Sarimu Inoue, Chita-gun (JP)

(73) Assignee: DENSO WAVE INCORPORATED, Aichi-Pref. (JP)

( * ) Notice: Subject to any disclaimer, the term of this patent is extended or adjusted under 35 U.S.C. 154(b) by 14 days.

(21) Appl. No.: 18/190,555

(22) Filed: Mar. 27, 2023

(65) Prior Publication Data
US 2023/0302954 A1   Sep. 28, 2023

(30) Foreign Application Priority Data
Mar. 28, 2022   (JP) .................................. 2022-051752

(51) Int. Cl.
*B60L 55/00* (2019.01)
*H02J 7/35* (2006.01)
*H02M 3/335* (2006.01)

(52) U.S. Cl.
CPC .............. *B60L 55/00* (2019.02); *H02J 7/35* (2013.01); *H02M 3/335* (2013.01); *B60L 2210/14* (2013.01); *B60L 2210/30* (2013.01)

(58) Field of Classification Search
CPC .. B60L 55/00; B60L 2210/14; B60L 2210/30; H02J 7/35; H02M 3/335
See application file for complete search history.

(56) References Cited

FOREIGN PATENT DOCUMENTS

JP    2004-129320 A    4/2004

*Primary Examiner* — Robert L Deberadinis
(74) *Attorney, Agent, or Firm* — Oliff PLC (57) ABSTRACT

A power supply system charging a battery of an electric car through a grid power line and supplying electric power stored in the battery to electrical equipment through an in-home wiring, including: an isolated converter connected to the grid power line, the in-home wiring and the battery; and a controller controlling the isolated converter. The isolated converter includes a plurality of isolated converter circuits each including two full-bridge circuits. One of the plurality of isolated converter circuits further includes two booster circuits. The controller receives load amount information depending on the operation state of the electrical equipment from a monitor device and switches, on the basis of the load amount information, an operating mode of the isolated converter to one of first mode to fourth mode. The controller causes the two booster circuits to perform a boosting operation in the first mode and third mode.

1 Claim, 8 Drawing Sheets

POWER SUPPLY SYSTEM

CROSS-REFERENCE TO RELATED APPLICATION

This application is based on and claims the benefit of priority from earlier Japanese Patent Application No. 2022-051752 filed Mar. 28, 2022, the description of which is incorporated herein by reference.

BACKGROUND OF THE INVENTION

Technical Field of the Invention

The present disclosure relates to a system configured to charge a battery of an electric car through a grid power line and supply an electric power stored in the battery to in-home electrical equipment through an in-home wiring.

Related Art

Figure 9:
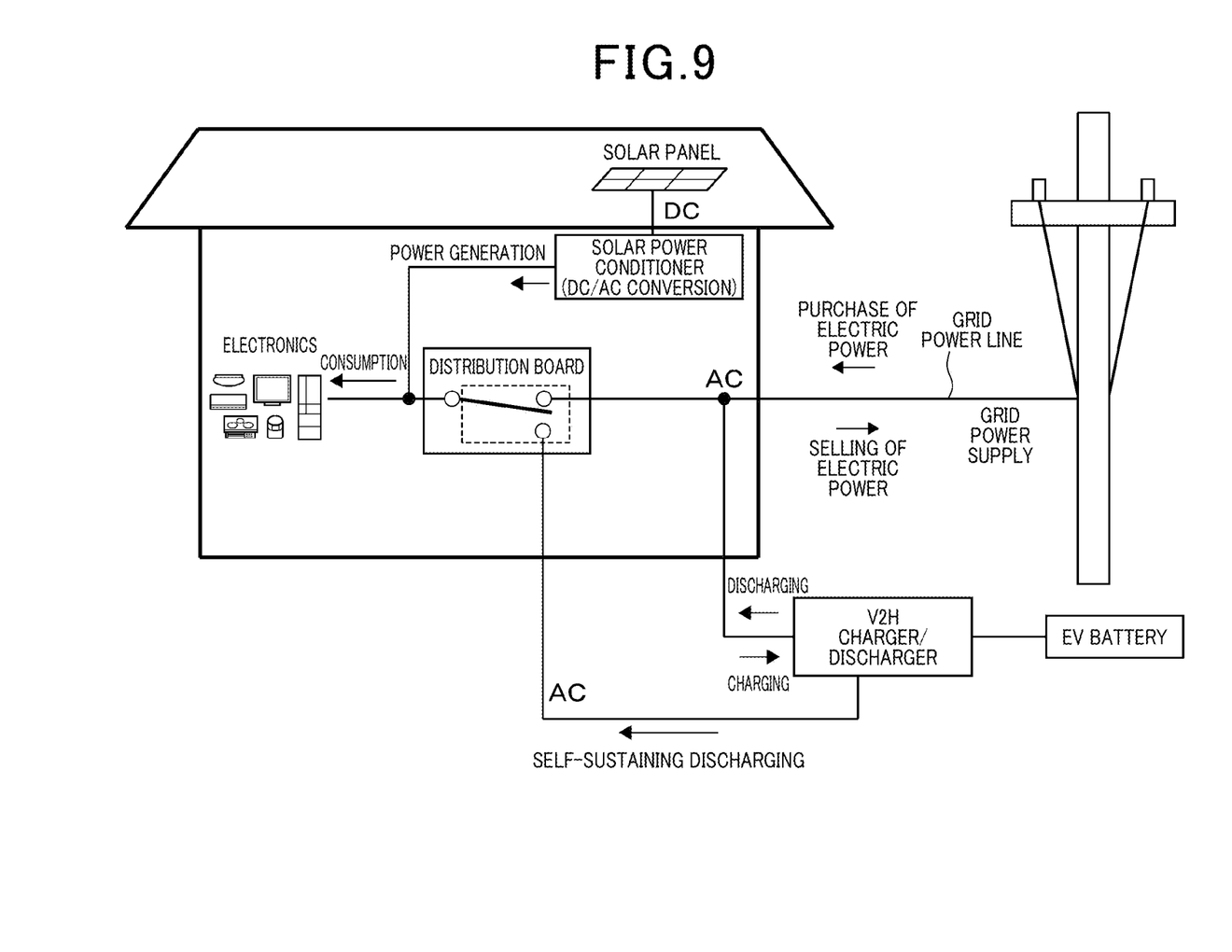
FIG. 9 is a diagram for explaining a conventional V2H system.

Demand has recently been increasing for V2H (Vehicle to Home) systems that are configured to charge a battery of an electric car through a grid power line and supply an electric power stored in the battery to in-home electrical equipment through an in-home wiring as illustrated in FIG. 9. For example, even in a case where a grid power network loses power during a disaster, the V2H system can cause in-home electrical equipment to operate by supplying an electric power.

A V2H charger/discharger installed in the V2H system includes an isolated converter and an AC/DC inverter inside. For the efficient use of the electric power stored in the battery of the electric car, it is desirable to improve a conversion efficiency of the isolated converter. Since in-home electrical equipment is of various types and the number of electrical equipment that simultaneously operates is likely to vary, it is desired to maintain a high conversion efficiency for a wide load range.

According to PTL 1 (JP 2004-129320 A), for the purpose of improving a power factor of a switching power circuit to increase an efficiency, three switching converters are connected in parallel and switching among the switching converters is performed for operation in accordance with a load amount, causing only one of the switching converters to operate or causing two or more of the switching converters to operate in parallel.

SUMMARY

Figure 10:
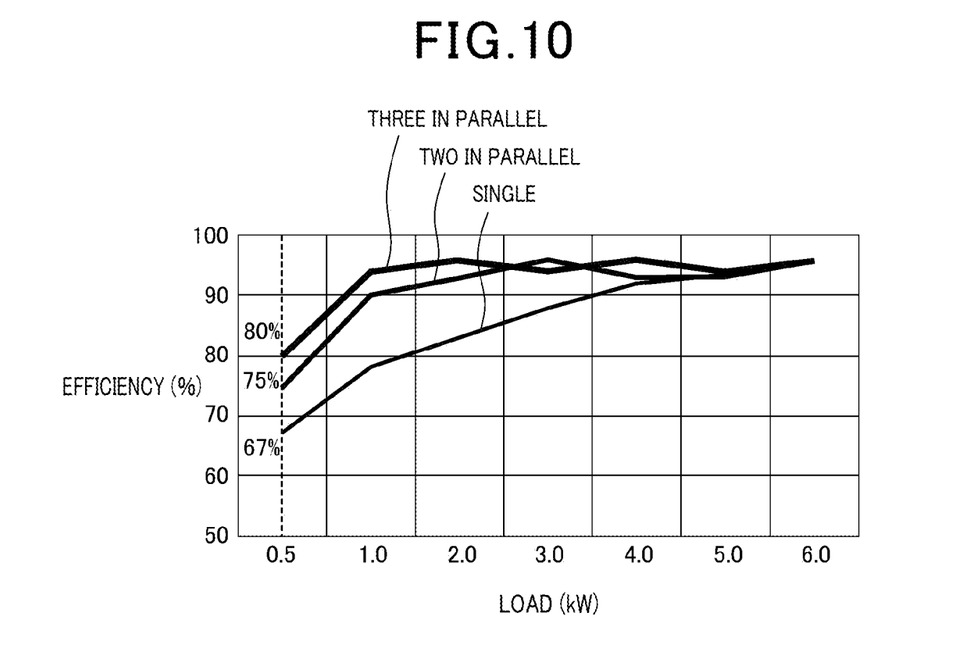
FIG. 10 is a diagram illustrating a relationship between load amount and conversion efficiency in relation to each parallel operation.

FIG. 10 illustrates respective relationships between load amount and conversion efficiency when assumed numbers of isolated converters being in operation at a maximum load amount of 6 kW are one, two in parallel, and three in parallel. Here, a plurality of (n of) isolated converters being in operation in parallel is referred to as a parallel operation (n-parallel operation). For two-parallel operation and three-parallel operation, assuming that a maximum load amount is 6 kW, each of the isolated converters has load amounts of 3 kW and 2 kW, respectively. Referring to FIG. 10, an efficiency when the load is low increases with an increase in the number of isolated converters being operated in parallel. Therefore, it is possible to increase a conversion efficiency by using parallel operation according to a load amount as disclosed in PTL 1 and performing parallel operation when a load is low. However, a configuration of PTL 1 disadvantageously increases costs and circuit size with an increase in the number of isolated converters connected in parallel.

The present disclosure is made in view of the above-described actual circumstances and an object of the present disclosure is to provide a power supply system enabling a reduction in an increase in costs and circuit size and, even in a case where a load amount varies, a reduction in a decrease in conversion efficiency.

A power supply system according to an embodiment of the present disclosure is configured to charge a battery of an electric car through a grid power line and supply an electric power stored in the battery to in-home electrical equipment through an in-home wiring, the power supply system including:

an isolated converter connected to the grid power line, the in-home wiring and the battery; and
a controller configured to control the isolated converter, in which
the isolated converter includes a plurality of isolated converter circuits,
the plurality of isolated converter circuits are connected to each other in parallel,
the plurality of isolated converter circuits each include an isolated unit and two full-bridge circuits,
the isolated unit is interposed between the two full-bridge circuits, one of the plurality of isolated converter circuits is a booster converter circuit further including two booster circuits,
the two booster circuits are connected to the respective two full-bridge circuits,
the controller is configured to receive, from a monitor device configured to monitor an operation state of the in-home electrical equipment, load amount information depending on the operation state and switch, on the basis of the load amount information, an operating mode of the isolated converter to one of:
(a) a first mode to cause each of the two full-bridge circuits of the booster converter circuit to operate as a half-bridge circuit;
(b) a second mode to cause each of the two full-bridge circuits of one of the plurality of isolated converter circuits to operate as a full-bridge circuit;
(c) a third mode to cause each of the two full-bridge circuits of the booster converter circuit to operate as the half-bridge circuit and each of the two full-bridge circuits of another one or more of the plurality of isolated converter circuits to operate as the full-bridge circuit; and
(d) a fourth mode to cause each of the two full-bridge circuits of each of two or more of the plurality of isolated converter circuits to operate as the full-bridge circuit, and
the controller is configured to cause the two booster circuits to perform a boosting operation in the first mode and third mode.

DETAILED DESCRIPTION OF THE PREFERRED EMBODIMENTS

Figure 2:
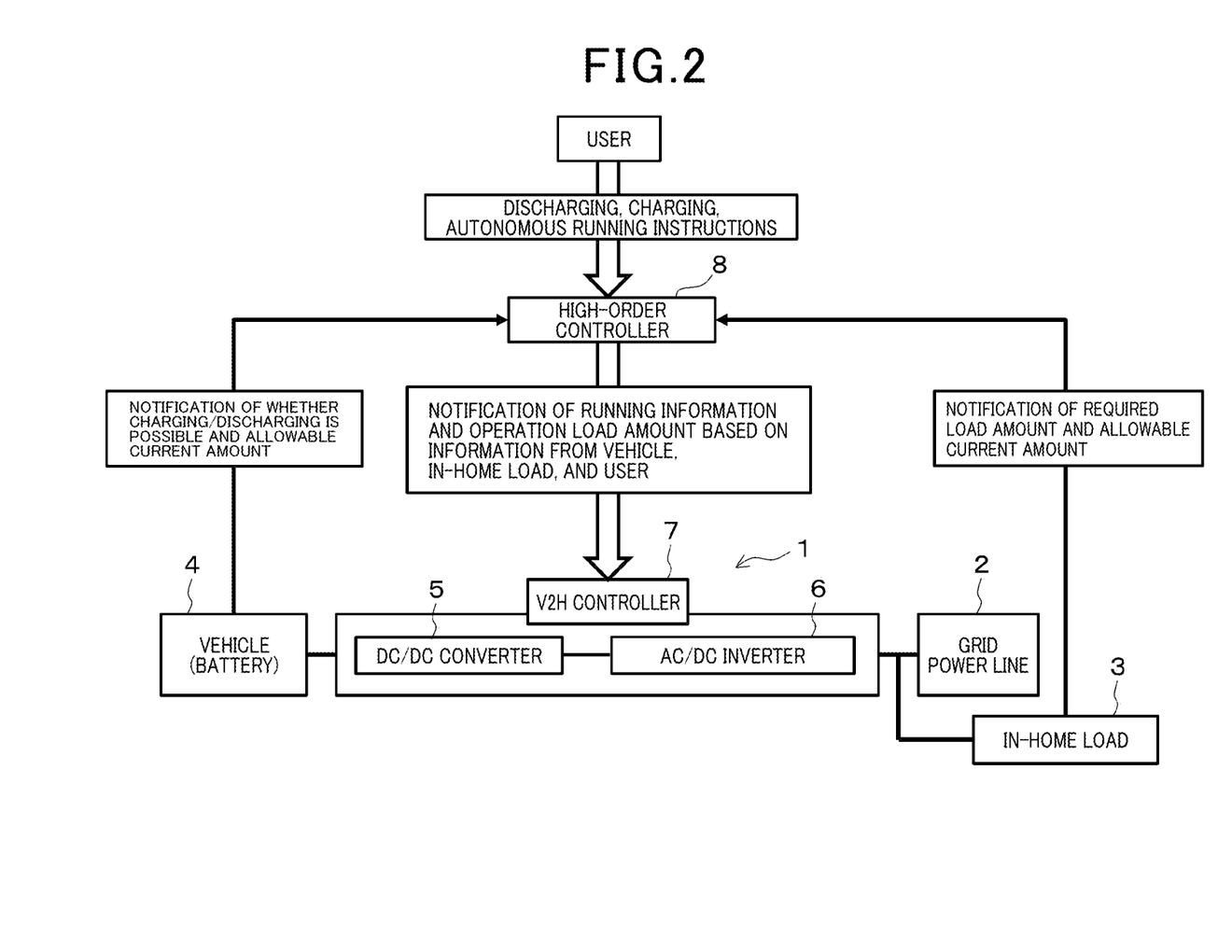
FIG. 2 is a diagram for explaining a V2H system according to the embodiment of the present disclosure.
Figure 11:
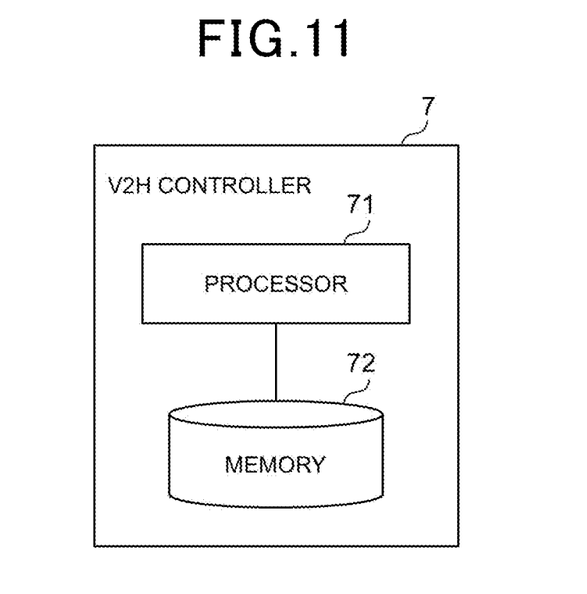
FIG. 11 is a hardware configuration diagram of the V2H controller according to the embodiment of the present disclosure.

Description will be given below of an embodiment of the present disclosure. FIG. 2 is a diagram for explaining a V2H system that is an example of a power supply system of the present embodiment. A V2H system 1 is connected to a grid power line 2, an in-home load 3, and a battery that supplies an electric power to a motor for driving for travel in a vehicle 4 that is an electric car. The V2H system 1 is connected to the in-home load 3 through an in-home power wiring. The V2H system 1 includes a DC/DC converter 5, an AC/DC inverter 6, and a V2H controller 7. The V2H controller 7 includes a processor 71 such as a CPU (Central Processing Unit) and a memory 72 such as a ROM (Read Only Memory) or a RAM (Random Access Memory) as illustrated in FIG. 11.

The V2H system 1 converts an alternating-current power supplied through the grid power line 2 to a direct-current power to charge the battery of the vehicle 4. In addition, in an event that a power failure occurs due to a disaster and no power is supplied through the grid power line 2, the V2H system 1 converts a direct-current power discharged from the battery of the vehicle 4 to an alternating-current power and supplies the power to the in-home load 3. The in-home load 3 includes, for example, electrical equipment such as a refrigerator, a washing machine, an air conditioner, a television receiver, a microwave, and an IH (Induction Heating) cooking device.

A high-order controller 8, which corresponds to a monitor device, is connected to the in-home load 3, the vehicle 4, and the V2H controller 7 and communicates with the in-home load 3, the vehicle 4, and the V2H controller 7. The high-order controller 8 receives from the in-home load 3 a notification of a load amount (i.e., amount of electric power) and an allowable current amount depending on an operation status of each electrical equipment. The high-order controller 8 also receives instructions regarding discharging, charging, and autonomous running, and the like from a user via a user interface function. Further, the high-order controller 8 receives a notification of whether charging/discharging is possible and an allowable current amount from the vehicle 4. The high-order controller 8 then notifies the V2H controller 7 of running information (i.e., a running command) and an operation load amount on the basis of the information from the vehicle 4, the in-home load 3, and the user.

Figure 1:
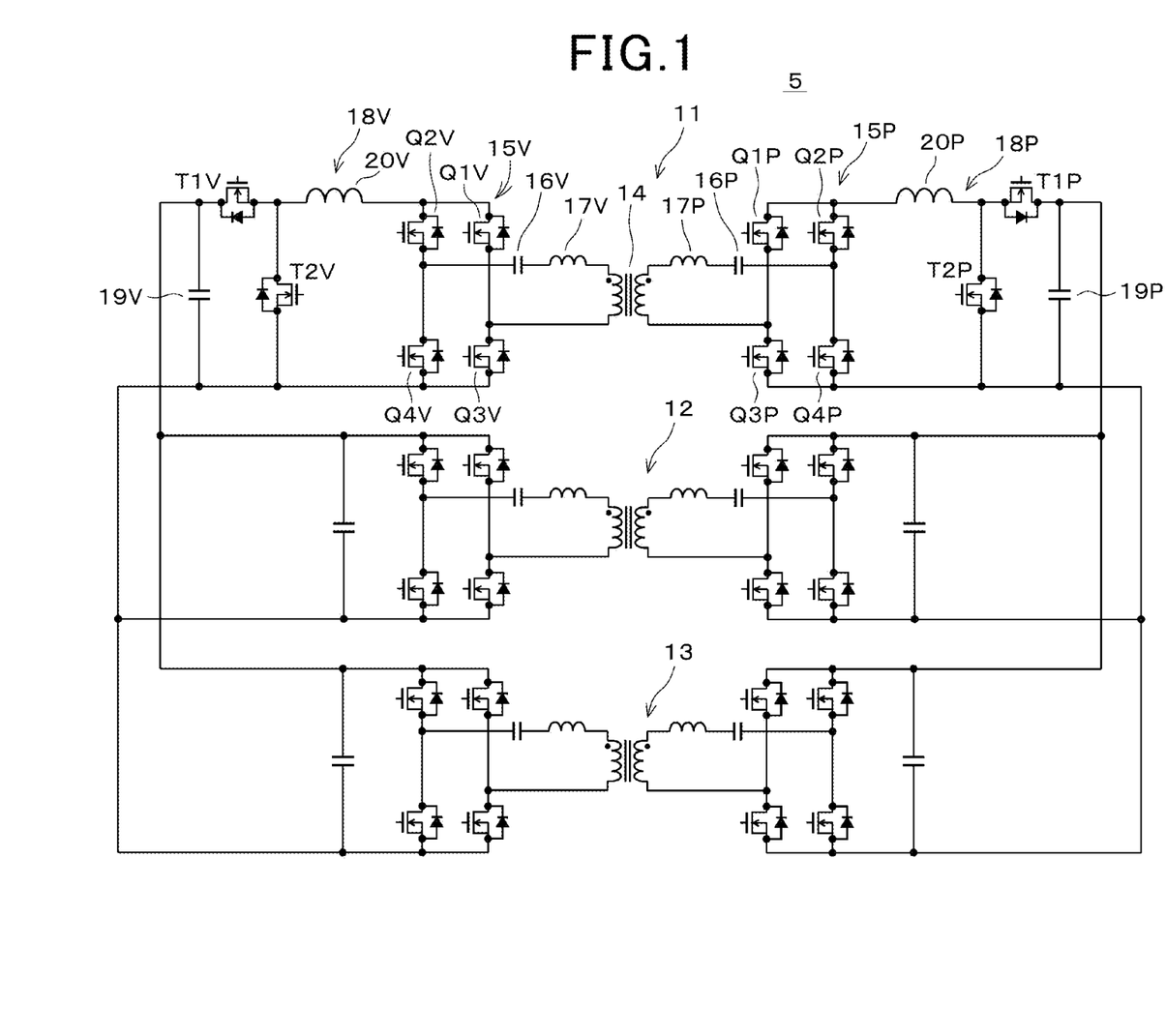
FIG. 1 is a circuit diagram illustrating a DC/DC converter according to an embodiment of the present disclosure.

FIG. 1 is a circuit diagram of the DC/DC converter 5. The DC/DC converter 5, which is an isolated converter, includes, for example, three isolated converter circuits 11, 12, and 13 connected in parallel. The isolated converter circuits 11 to 13 each include a transformer 14, which is an isolated unit, and both sides of the transformer 14 are connected to respective full-bridge circuits 15V, 15P whose FETs Q1 to Q4 are H-bridge-connected. FET Q1 to Q4 are switching elements such as N-channel MOSFETs (metal oxide semiconductor field effect transistors, hereinafter also referred to as FETs). It should be noted that a left side in the drawing is occasionally referred to as V-side as being a side corresponding to the vehicle 4 and a right side in the drawing is occasionally referred to as P-side as being a side corresponding to the grid power line 2. In addition, adding V, P to a reference sign is omitted unless it is particularly necessary to distinguish between the V-side and the P-side.

A common connection point of the FETs Q2V and Q4V of the full-bridge circuit 15V is connected to an end of a V-side coil of the transformer 14 through a condenser 16V and a coil 17V. In addition, a common connection point of the FETs Q1V and Q3V is connected to the other end of the V-side coil of the transformer 14. A common connection point of the FETs Q1P and Q3P of the full-bridge circuit 15P is connected to an end of a P-side coil of the transformer 14. In addition, a common connection point of the FETs Q2P and Q4P is connected to the other end of the P-side coil of the transformer 14 through a condenser 16P and a coil 17P.

Out of the three isolated converter circuits, only the isolated converter circuit 11 includes respective booster circuits 18V, 18P on the V-side and P-side. In other words, the isolated converter circuit 11 corresponds to a booster converter circuit. The booster circuit 18V includes series circuits of N-channel MOSFETs T1V and T2V connected to both ends of a smoothing capacitor 19V and a coil 20V connected to a common connection point of the FETs T1V and T2V and a drain of the FET Q1V. Switching operations of the FETs Q1V to Q4V, the FETs Q1P to Q4P, T1V to T2V, and T1P to T2P are to be controlled by the V2H controller 7.

Figure 3:
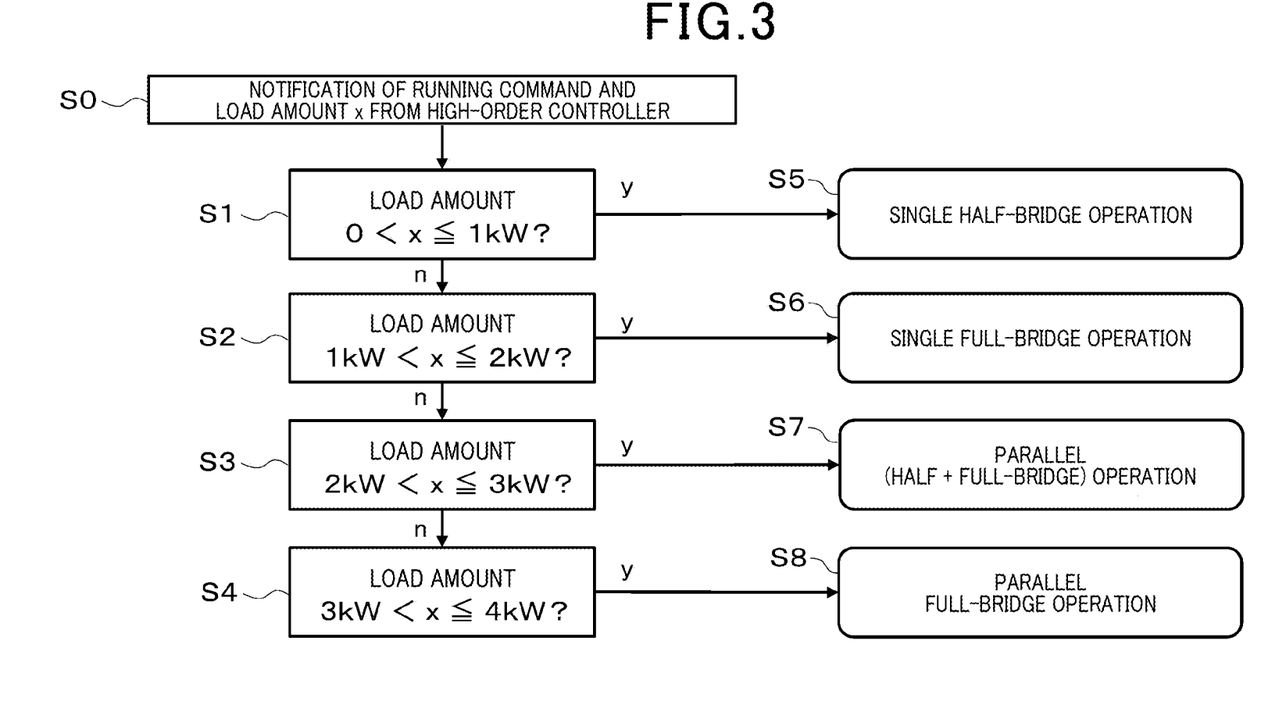
FIG. 3 is a flowchart illustrating a process for a V2H controller according to an embodiment of the present disclosure to control the DC/DC converter.

Now, description will be made on workings of the present embodiment. FIG. 3 is a flowchart illustrating a process for the V2H controller 7 to control the DC/DC converter 5. It should be noted that an allowable load amount for the isolated converter circuits 11 and 12 to be able to operate alone is determined to be 2 kW as a precondition. The V2H controller 7 causes the isolated converter circuit 11 to perform a half-bridge running that causes the full-bridge circuits 15 to perform half-bridge switching as described later; an allowable load amount allowed to operate by the half-bridge running is 1 kW.

It should be noted that full-bridge switching refers to causing all the four switching elements of the full-bridge circuit to perform the switching operations and half-bridge switching refers to causing only two of the four switching elements of the full-bridge circuit to perform the switching operations as if the full-bridge circuit substantially operated as a half-bridge circuit.

In response to a notification of a running command and a load amount x from the high-order controller 8 (S0), the V2H controller 7 determines which one of ranges below the load that the amount x is within in Steps S1 to S4.

Step S1: $0 < x \leq 1$ kW

Step S2: 1 kW<x≤2 kW
Step S3: 2 kW<x≤3 kW
Step S4: 3 kW<x≤4 kW

Figure 4:
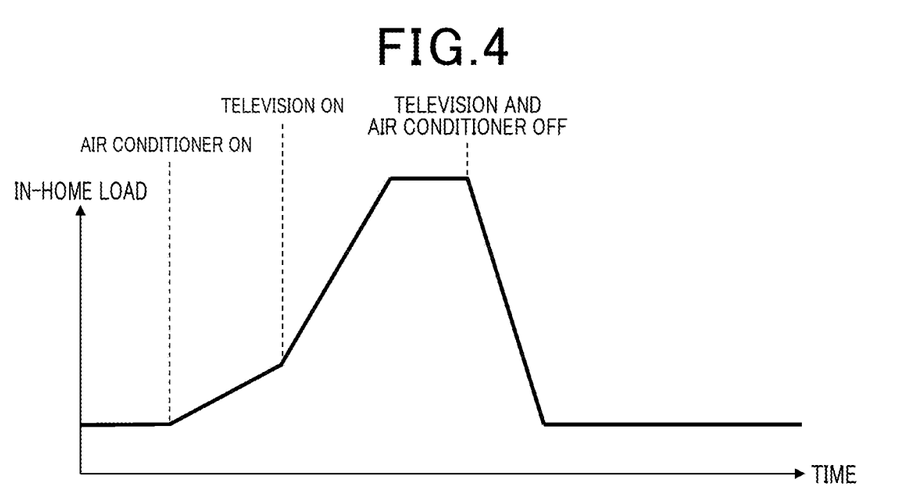
FIG. 4 is a diagram illustrating a change in in-home load with an elapse of time during a day.

As illustrated in FIG. 4, an operating status of each electrical equipment regarding the in-home load 3 changes with an elapse of time during a day, or an abscissa axis. For example, the load amount, with a load amount of equipment that is always in operation, such as a refrigerator, as base, increases with the start of an operation of equipment such as an air conditioner and a television receiver and the load amount decreases with the stop of the operation of the equipment.

The V2H controller 7 then controls, responsive to making a determination yes in any one of Steps S1 to S4, the DC/DC converter 5 as follows in corresponding one of Steps S5 to S8.

Figure 5:
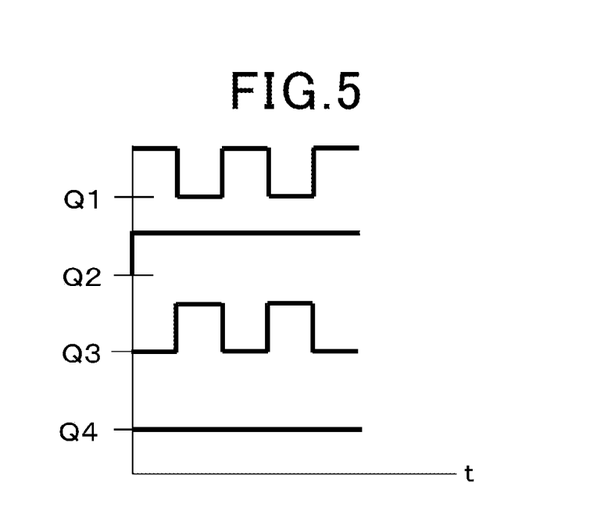
FIG. 5 is a timing chart illustrating half-bridge switching of a full-bridge circuit according to the embodiment of the present disclosure.

Step S5: single half-bridge operation
Step S6: single full-bridge operation
Step S7: parallel (half+full-bridge) operation
Step S8: parallel full-bridge operation The single half-bridge operation is an operating mode where the full-bridge circuits 15 of the isolated converter circuit 11 are caused to perform half-bridge switching. In other words, in this operating mode, the FET Q2 is turned ON, the FET Q4 is turned OFF, and the FETs Q1 and Q3 are alternately turned ON/OFF in an asynchronous manner at a duty ratio of 50% as illustrated in FIG. 5. Thus, the V2H controller 7 causes the full-bridge circuits 15 to perform switching substantially as if the full-bridge circuits 15 were half-bridge circuits. The single half-bridge operation corresponds to a first mode.

Figure 6:
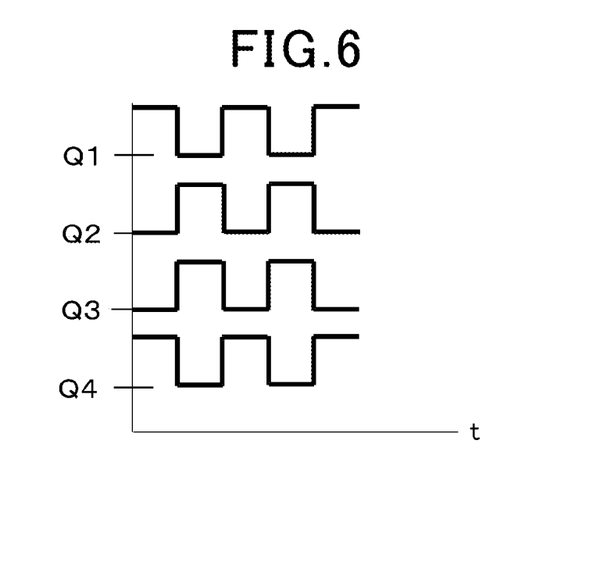
FIG. 6 is a timing chart illustrating full-bridge switching of the full-bridge circuit according to the embodiment of the present disclosure.

The single full-bridge operation is an operating mode where the full-bridge circuits 15 of the isolated converter circuit 11 are caused to perform full-bridge switching. In other words, in this operating mode, the FETs Q1 and Q4 are alternately turned ON/OFF in a synchronous manner at a duty ratio of 50% as illustrated in FIG. 6. Likewise, the FETs Q2 and Q3 are alternately turned ON/OFF in a synchronous manner at a duty ratio of 50%. A phase of each of the FETs Q2 and Q3 is opposite to a phase of each of the FETs Q1 and Q4. The single full-bridge operation corresponds to a second mode. It should be noted that in this operating mode, the isolated converter circuit 12 may be caused to perform full-bridge switching in place of the isolated converter circuit 11.

Figure 7:
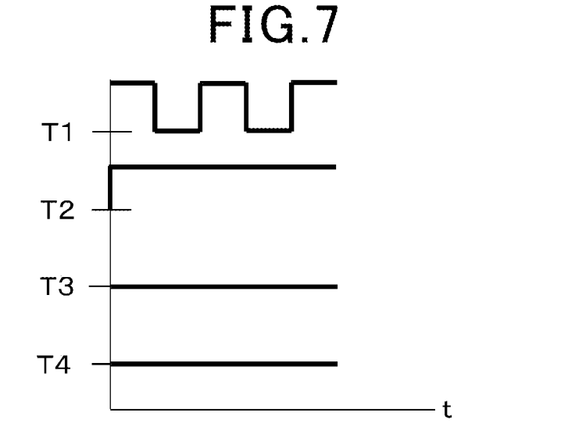
FIG. 7 is a timing chart illustrating a boosting operation performed by a booster circuit during charging of a battery of a vehicle according to the embodiment of the present disclosure.
Figure 8:
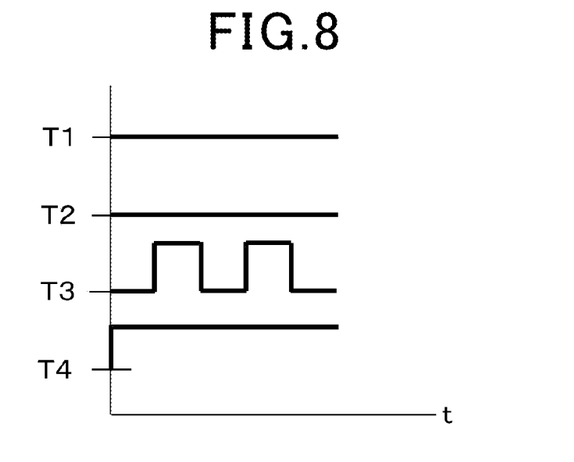
FIG. 8 is a timing chart illustrating a boosting operation performed by the booster circuit during discharge of the battery of the vehicle according to the embodiment of the present disclosure.

The parallel (half+full-bridge) operation is an operating mode where the above-described single half-bridge operation and a running that causes the isolated converter circuit 12 to perform full-bridge switching as the above-described single full-bridge operation are combined. The parallel (half+full-bridge) operation corresponds to a third mode. In addition, in causing the isolated converter circuit 11 to perform half-bridge switching in the first mode and the third mode, the V2H controller 7 causes the booster circuit 18 to perform a boosting operation. In charging the battery of the vehicle 4, the V2H controller 7 turns OFF the FETs T1P and T2P of the booster circuit 18P as illustrated in FIG. 7. The V2H controller 7 then turns ON the FET T2V of the booster circuit 18V and alternately turns ON/OFF the FET T1V at a duty ratio of 50%. In contrast, in discharging the battery of the vehicle 4, the FETs T1V and T2V of the booster circuit 18V are turned OFF as illustrated in FIG. 8. Then, the FET T1P of the booster circuit 18P is turned ON and the FET T2P is alternately turned ON/OFF at a duty ratio of 50%. A decrease in voltage due to half-bridge switching is thus compensated and, consequently, a decrease in efficiency is avoided.

The parallel full-bridge operation is an operating mode where the full-bridge circuits 15 of the isolated converter circuits 11 and 12 are caused to perform full-bridge switching. The parallel full-bridge operation corresponds to a fourth mode. The V2H controller 7 optimizes a conversion efficiency by switching the operating mode of the DC/DC converter 5 in accordance with a variation in the load amount of the in-home load 3 in this manner.

Here, it is assumed that in a three-parallel configuration illustrated in FIG. 1, an allowable load amount for one isolated converter circuit is 2 kW and a load range is 6 kW at a maximum. In this case, following steps for determining a load amount are added after Step S4.

Step S9: 4 kW<x≤5 kW
Step S10: 5 kW<x≤6 kW

The V2H controller 7 then controls, responsive to making a determination yes in any one of Steps S9 and S10, the DC/DC converter 5 as follows in corresponding one of Steps S11 to S12.

Step S11: parallel (half+full-bridge) operation
Step S12: parallel full-bridge operation In Steps S11, S12, running by the three-parallel operation is performed, where the full-bridge switching of the full-bridge circuit of the isolated converter circuit 13 is added to the parallel full-bridge operation in Step S8.

In addition, in order to achieve a load range of 6 kW at a maximum with an assumption that the load amount is defined by 1-kW increments on the basis of only the isolated converter circuits in parallel as described above, six isolated converter circuits are required with an assumption that an allowable load amount per circuit is 1 kW. The number of circuit elements required by the above-described other configuration (i.e., six-parallel configuration) and the number of circuit elements of the configuration of the present embodiment (i.e., three-parallel configuration) are as follows.

<Six-Parallel Configuration>
FET: 48, transformer: 6, coil: 12, capacitor: 24
<Three-Parallel Configuration>
FET: 28, transformer: 3, coil: 8, capacitor: 12

As described above, the configuration of the present embodiment can achieve the same performance as the above-described other configuration, although the number of circuit elements is smaller than that of the above-described other configuration.

According to the present embodiment, the V2H system charges the battery of the vehicle 4 through the grid power line 2 and supplies the electric power stored in the battery to a plurality of pieces of in-home electrical equipment as described above. The DC/DC converter 5, which is connected to the grid power line 2, the in-home wiring, and the battery, is to be controlled by the V2H controller 7. In the DC/DC converter 5, the isolated converter circuits 11 to 13, each of which includes the full-bridge circuits 15, are connected in parallel and the isolated converter circuit 11 is the booster converter circuit 11 including the booster circuit 18.

In response to receiving, from the high-order controller 8 monitoring an operation state of the in-home electrical equipment, load amount information depending on the operation state, the V2H controller 7 switches the operation of the DC/DC converter 5 to one of the first mode to fourth mode on the basis of the load amount information. In the first mode and third mode, the V2H controller 7 then causes the booster circuit 18 of the booster converter circuit 11 to perform the boosting operation to prevent a decrease in conversion efficiency due to half-bridge switching.

Thus, in a case where the load amount depending on the operation state of the in-home electrical equipment is small and the amount of electric power outputted through the DC/DC converter 5 is small, the V2H controller 7 can increase the conversion efficiency of the DC/DC converter 5 by switching the operation of the DC/DC converter 5 to the first mode. In addition, the conversion efficiency can be maintained by switching the operation of the DC/DC converter to one of the second mode to fourth mode in accordance with an increase in the load amount. Further, it is possible to reduce the number of circuit elements and reduce an increase in costs and circuit size as compared with a configuration that causes the same number of isolated converter circuits in parallel to always perform only one of full-bridge switching and half-bridge switching.

The present invention is not limited only to the embodiment described above or illustrated in the drawings and accepts modifications or extensions as follows.

The switching elements are not limited to the N-channel MOSFETs and a P-channel MOSFET may be used on a high side or an IGBT (insulated gate bipolar transistor) or any other bipolar transistor may be used.

The number of isolated converter circuits in parallel may be 2 or 4 or more.

The allowable load amount per isolated converter circuit is not limited to the numerical value described in the embodiment and may be determined as desired in accordance with an individual design.

What is claimed is:

1. A power supply system configured to charge a battery of an electric car through a grid power line and supply an electric power stored in the battery to in-home electrical equipment through an in-home wiring, the power supply system comprising:
   an isolated converter connected to the grid power line, the in-home wiring and the battery; and
   a controller configured to control the isolated converter, wherein
   the isolated converter includes a plurality of isolated converter circuits,
   the plurality of isolated converter circuits are connected to each other in parallel,
   the plurality of isolated converter circuits each include an isolated unit and two full-bridge circuits,
   the isolated unit is interposed between the two full-bridge circuits,
   one of the plurality of isolated converter circuits is a booster converter circuit further including two booster circuits,
   the two booster circuits are connected to the respective two full-bridge circuits,
   the controller is configured to receive, from a monitor device configured to monitor an operation state of the in-home electrical equipment, load amount information depending on the operation state and switch, on a basis of the load amount information, an operating mode of the isolated converter to one of:
   (a) a first mode to cause each of the two full-bridge circuits of the booster converter circuit to operate as a half-bridge circuit;
   (b) a second mode to cause each of the two full-bridge circuits of one of the plurality of isolated converter circuits to operate as a full-bridge circuit;
   (c) a third mode to cause each of the two full-bridge circuits of the booster converter circuit to operate as the half-bridge circuit and each of the two full-bridge circuits of another one or more of the plurality of isolated converter circuits to operate as the full-bridge circuit; and
   (d) a fourth mode to cause each of the two full-bridge circuits of each of two or more of the plurality of isolated converter circuits to operate as the full-bridge circuit, and
   the controller is configured to cause the two booster circuits to perform a boosting operation in the first mode and third mode.

* * * * *